Sept. 7, 1965     L. S. JAWORSKI     3,204,308

MOLDING CLIP

Filed July 23, 1962

INVENTOR.
LEONARD S. JAWORSKI
BY Malcolm W. Fraser
ATTORNEY 3,204,308
MOLDING CLIP
Leonard S. Jaworski, Toledo, Ohio, assignor, by mesne assignments, to The Bishop and Babcock Corporation, Toledo, Ohio, a corporation of Ohio
Filed July 23, 1962, Ser. No. 211,563
1 Claim. (Cl. 24—73)

This invention relates to sheet metal fasteners but particularly to such fasteners which are mounted in an aperture provided in a supporting panel and an object is to produce a new and improved fastener of this type in which the panel-engaging stud is integral with the fastener and has unique features of design enabling the same to be more readily mounted in the panel aperture and affording flexible resilience in different lateral directions to enable same automatically to accommodate itself to variations in the arrangement and form of the panel aperture.

Another object is to produce a sheet metal fastener of the above type which can be efficiently and economically produced on a quantity production basis.

Other objects and advantages of the invention will hereafter appear, and, for purposes of illustration but not of limitation, an embodiment of the invention is shown on the accompanying drawings in which FIGURE 1 is a side elevation of a molding clip embodying the invention;

Figure 1:
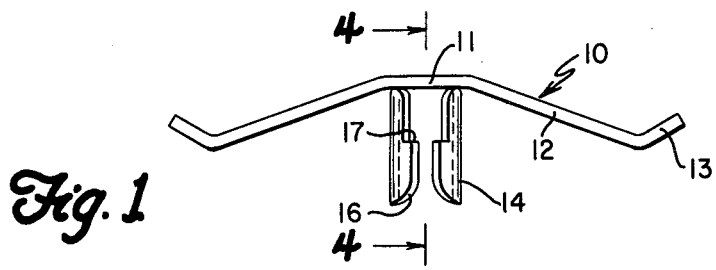
Figure 2:
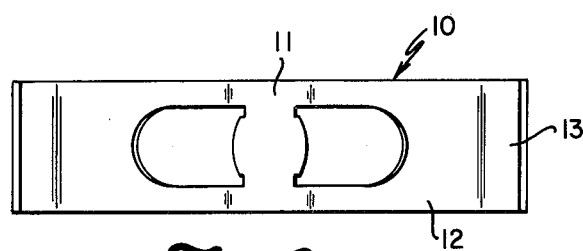
FIGURE 2 is a top plan view of the molding clip shown in FIGURE 1.
Figure 3:
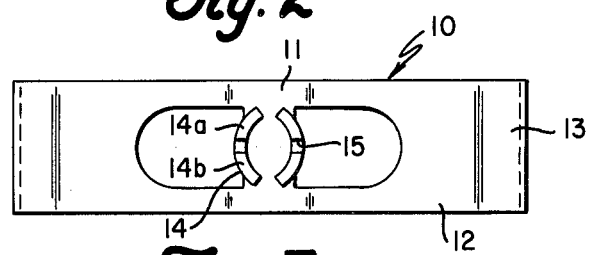
FIGURE 3 is a bottom plan view of the molding clip shown in FIGURE 1.
Figure 5:
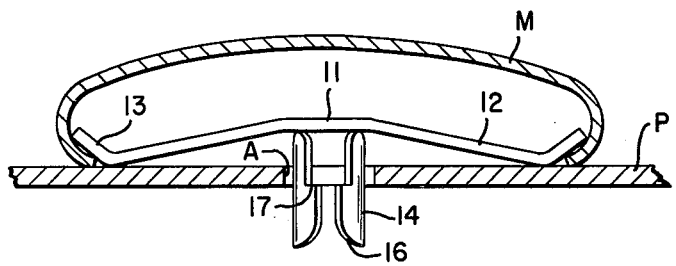
FIGURE 5 is a side elevation of the molding clip mounted on a supporting panel and with a molding strip applied thereto.

The illustrated embodiment of the invention comprises a molding clip of spring metal having a head portion 10 in the form of a relatively narrow strip of sheet metal having a straight central portion 11 from which extend integral arms 12 which incline outwardly and downwardly. The arms 12 have at their outer ends upwardly inclined terminal portions 13 under which the inwardly curled edges of a molding strip M engage, as indicated on FIGURE 5, and as is well understood by those skilled in this art.

Integral with the head portion 10 of the fastener and extending at substantially right angles therefrom is a stud portion which in this instance comprises a pair of legs 14 which are struck respectively from the intermediate portions of the arms 12, as indicated on the drawings. Each of the legs 12 is arcuate in cross section, the curvature of each leg being in an outward direction. The legs 14 are generally parallel to each other and are spaced laterally from each other a short distance.

Each leg 14 is divided into two sections 14a and 14b by an elongate relatively narrow slit 15 which extends from a point near the juncture of the leg and the head portion 11 to the free outer end thereof. Each slit 15 is disposed midway of the lateral dimension of the respective leg. It must be understood that each leg section is resiliently flexible toward and away from its adjacent leg section and each leg section can flex toward and away from the opposite leg. This affords almost universal flexibility of the legs and their respective sections in lateral directions. This is particularly desirable in the application of the molding clip to the aperture A of a supporting panel P because of irregularities in the spacing and conformation of such apertures. The structure also is such as to facilitate the mounting of the molding clip in position of use.

It will be noted that the free end of each leg 14 is rounded or cam-shaped, as indicated at 16, and this has advantage in the application to the panel aperture enabling the legs to be applied to a smaller aperture, the cam edges 16 causing the sections of each leg to be forced toward each other to enable entrance of the stud into a smaller panel aperture A.

Figure 4:
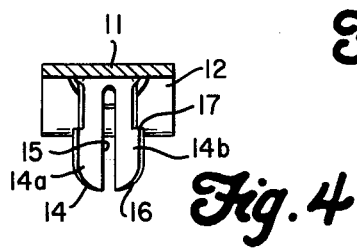
FIGURE 4 is a vertical sectional elevation substantially on the line 4—4 of FIGURE 1.

A portion of the length of each leg section is reduced in width as indicated particularly in FIGURE 4. This reduced portion terminates in a shoulder 17 disposed on the outer side of each leg section. The shoulders 17 are so arranged that when the stud is forced through the panel aperture A and the arms 12 are flexed to enable the shoulders to pass through and engage the opposite side of the supporting panel P, the arms 12 afford spring pressure for holding the shoulders or abutments 17 firmly in engagement with the under side of the panel P. This serves securely to retain the molding clip in position of use. By moving the leg sections 14a and 14b toward each other it will be manifest that the clip can be released from engagement with the supporting panel P.

Numerous changes in details of construction, arrangement and choice of materials may be effected without departing from the spirit of the invention especially as defined in the appended claim.

What I claim is:

A molding clip comprising a one-piece spring sheet metal unit having a head portion comprising a relatively narrow strip provided with a straight central portion, outwardly and downwardly inclined arms extending from the ends of said central portion respectively, upwardly extending terminal portions on said arms respectively for molding strip engagement, legs struck from said arms respectively and depending at approximately right angles to said central portion, said legs being in spaced parallel relation to each other and arcuate in cross section, each leg having a longitudinally elongate centrally disposed slit extending from adjacent the juncture of the leg to said head portion thereby providing a pair of sections for each leg, the free end of said leg being curved for cam-like engagement with a panel aperture, the outer side of each leg section being reduced in width at the upper portion to provide a shoulder so arranged that, when the legs are forced through a panel aperture with said arms of the head portion flexed against one side of the panel, said arms afford spring pressure for holding said shoulders in engagement with the opposite side of the panel, and the structure being such that the sections of each leg are flexibly resilient toward each other and the legs are flexibly resilient toward each other thereby to enable same to accommodate to variations in form and arrangement of the panel aperture.

References Cited by the Examiner
UNITED STATES PATENTS

| 2,048,660 | 7/36 | Jones. | |
| 2,315,211 | 3/43 | Kost | 85—5 |
| 2,500,377 | 3/50 | Poupitch | 24—213 |
| 2,845,672 | 8/58 | Molene | 24—213 X |
| 2,948,368 | 8/60 | Arnold | 189—88 |

FOREIGN PATENTS

| 789,664 | 8/35 | France. |
| 856,566 | 12/60 | Great Britain. |

DONLEY J. STOCKING, Primary Examiner.

JACOB SHAPIRO, Examiner.